Aug. 4, 1925.
A. L. JACKSON
1,548,687
SIGNAL
Filed July 17, 1922     2 Sheets-Sheet 1
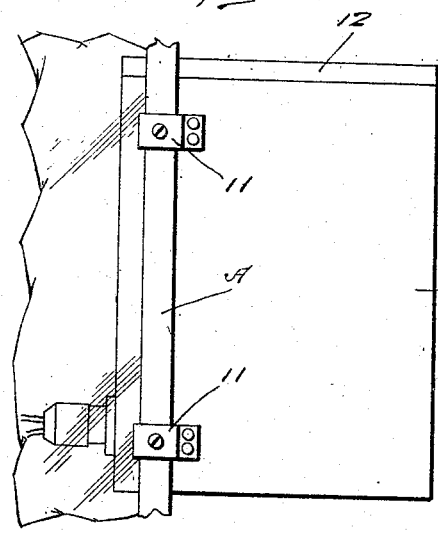
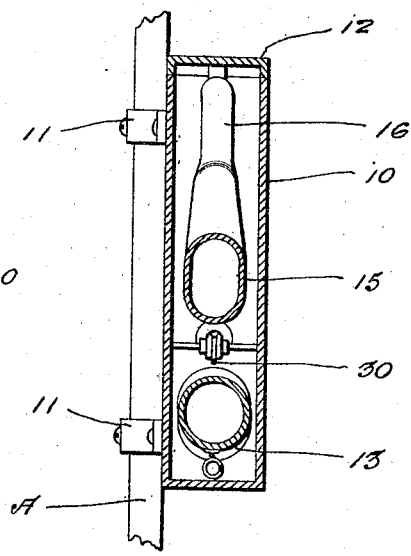
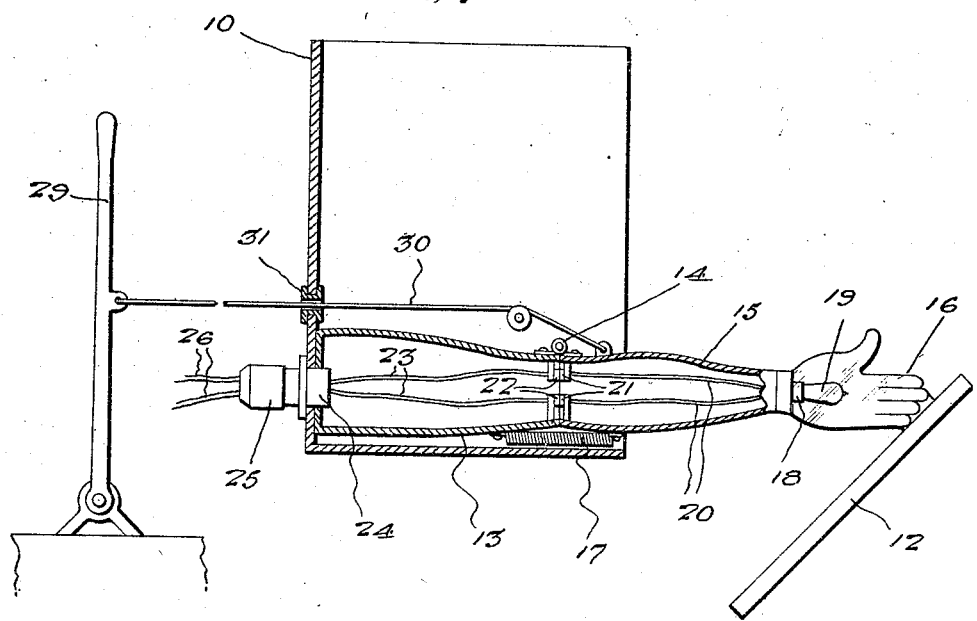
A. L. Jackson INVENTOR
BY Victor J. Evans
ATTORNEY Aug. 4, 1925.
A. L. JACKSON
SIGNAL
Filed July 17, 1922
1,548,687
2 Sheets-Sheet 2
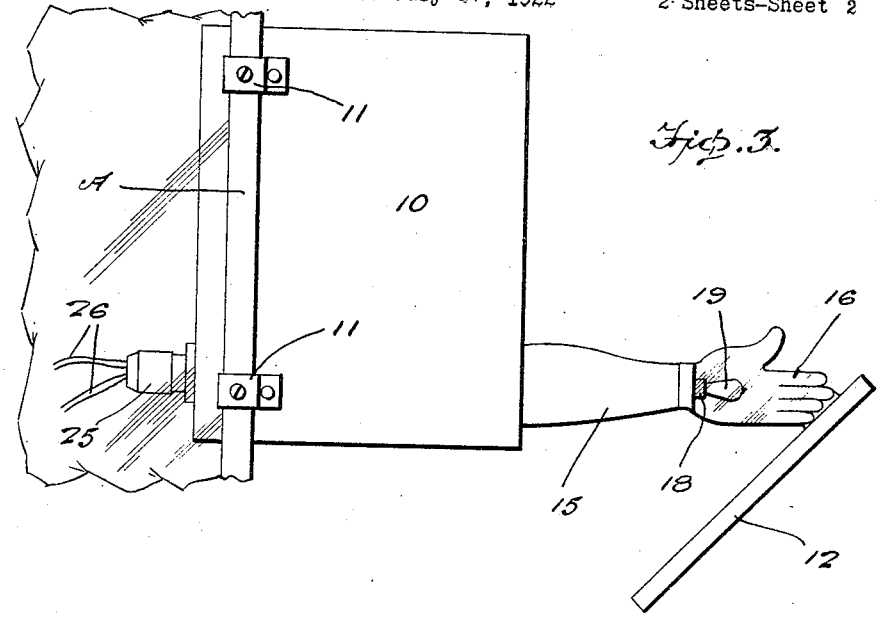
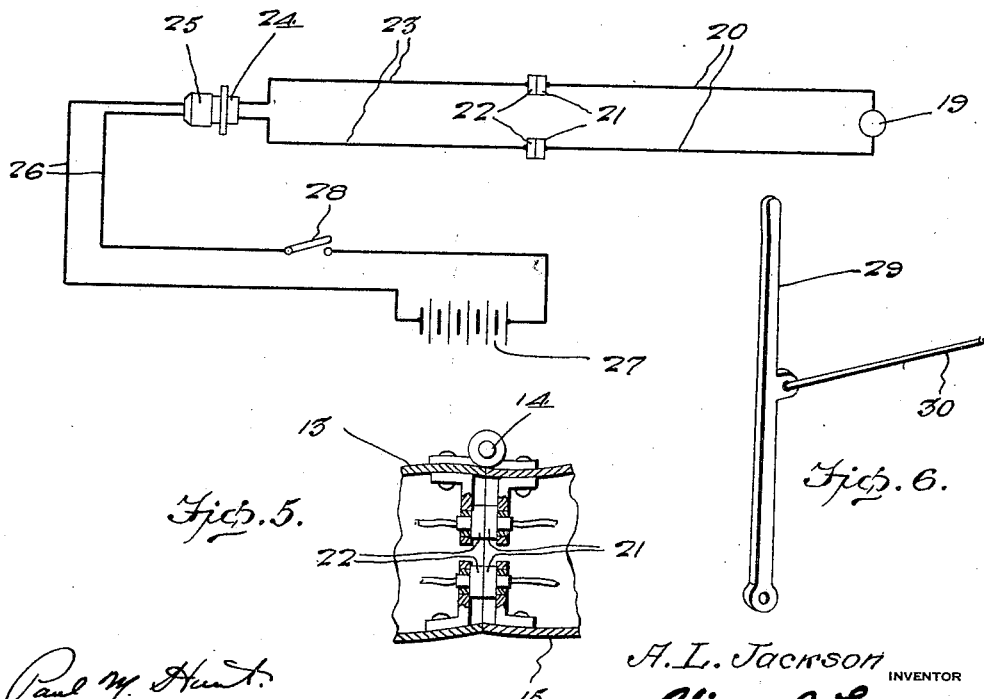

Patented Aug. 4, 1925.

1,548,687

UNITED STATES PATENT OFFICE.

ANDREW L. JACKSON, OF CLEVELAND, OHIO.

SIGNAL.

Application filed July 17, 1922. Serial No. 575,613.

*To all whom it may concern:*

Be it known that I, ANDREW L. JACKSON, a citizen of the United States, residing at Cleveland, in the county of Cuyahoga and State of Ohio, have invented new and useful Improvements in Signals, of which the following is a specification.

This invention relates to signal devices, particularly to direction indicators, and has for its object the provision of a novel device constructed to resemble a human arm and hand and mounted upon the windshield or other convenient portion of an automobile, the construction and arrangement being such that the device may be projected to extend in signalling position for apprising the drivers of other vehicles, pedestrians and traffic officers of an intended change in direction of travel or a contemplated stop.

An important object is the provision of a signal of this character which is provided with automatically operated electric illuminating means whereby the device will be rendered equally efficient by night as by day.

An additional object is the provision of a device of this character which will be simple and inexpensive in manufacture, easy to install and operate, efficient and durable in use and a general improvement in the art.

With the above and other objects and advantages in view the invention consists in the details of construction to be hereinafter more fully described and claimed and illustrated in the accompanying drawings, in which:

Figure 1 is an elevation of the device in inoperative position showing it mounted upon the windshield of an automobile, Figure 2 is a vertical section through the casing of the device in inoperative position, Figure 3 is a view similar to Figure 1 but showing the signal in its extended position, Figure 4 is a longitudinal section therethrough, Figure 5 is a horizontal section taken through the hinge connection and illustrating the automatic circuit closing means, Figure 6 is a detail view of the operating lever, Figure 7 is a diagram of the electric circuit.

Referring more particularly to the drawings the letter A designates one side bar of a windshield of an automobile, it being preferable that my device be mounted upon this windshield bar, though it should be understood that the device might be located at some other point as for instance at one side of a window opening in a sedan or limousine.

In carrying out the invention I provide a suitable casing 10 of any preferred shape and size as well as material and this casing is preferably painted or enameled to present a pleasing appearance and to prevent rusting from the weather. This casing might be secured to the windshield in various ways, though a convenient arrangement is to provide clamps 11 carried by the casing and engageable with the windshield bar. The casing is provided with a removable cover portion 12 mounted in a manner to be described. Secured within this casing is one end of the signalling device which is formed of movably connected sections disposed within the casing when in inoperative position and adapted to be projected into exposed position for giving a signal. This signalling device is made as the representation of a human arm and hand and consists of a stationary upper arm portion 13 upon the free end of which is hinged, as shown at 14, a lower arm portion 15 which carries a hand portion 16. The hinge joint is provided with a spring 17 which normally tends to swing the signal member in such a way that the lower arm portion and hand portion will be moved to signalling position.

The hand member 16 is formed hollow and of transparent or translucent material and located therein is a socket 18 for an incandescent bulb 19 to which are connected wires 20 which lead to a pair of metallic contacts 21 secured within the lower arm member 15 near the hinge joint. The lower arm member may be formed hollow or may be formed solid with a hole bored therethrough for the passage of the wires 20. Secured within the upper arm member 13 near the hinge joint is a pair of contacts 22 which are connected with wires 23 which lead through the upper arm member and to a suitable connector 24 with which may be engaged a connector 25 from which lead wires 26 connected with the storage battery 27 of the car and with a control switch 28. The arrangement of the contacts 21 and 22 is such that when the signal is in its operative or extended position these contacts will be in engagement for closing the circuit through the bulb 19.

It is conceivable that use might be made of any one of a large variety of means for swinging the device to its signalling position, though in actual practice I prefer to provide a lever 29 which is pivoted on the floor or other desired location and which has connected therewith a flexible member 30 which extends through guides 31 and which is connected with the lower side of the movable arm member 15 whereby to pull the same down when desired to give a signal. The cover 12 referred to is secured to the lower side of the hand member and is of course carried thereby at all times, this cover member seating upon the casing 10 for closing the same when the device is swung into inoperative position.

In the operation of the device it will be seen that when the operator desires to give a signal he either presses upon or releases the lever 29 depending upon the arrangement whereupon the member 30 will operate to swing the movable or lower arm member 15 downwardly thus bringing the hand member 16 out of the casing and causing it to be exposed to view. When the control switch 28 is closed, as is necessary when operating the device at night, when the lower arm member is swung outwardly and downwardly by operation of the pedal or lever, the engagement of the contacts 21 with the contacts 22 will cause the circuit to be closed through the bulb 19 which which will result in illumination of the hand member so that it will be clearly visible. The circuit is broken automatically when the device is swung into inoperative position and the cover 12 carried by the hand member will form a closure for the casing.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A signalling device comprising a casing having an open side, means for mounting said casing on a vehicle, a stationary arm member mounted within the lower portion of said casing, a movable arm member formed as the representation of a human arm and hinged upon the free end of said stationary member and carrying a hand portion made in the representation of a human hand, a coil spring having its respective ends connected with the respective arm members at opposite sides of said hinged connection, said coil spring adapted to swing the movable arm member to signalling position laterally of said casing with the rear of the hand portion disposed toward the rear of the vehicle, and a pull element having connection with the movable arm portion and adapted to return said movable arm portion to its non-signalling position within the casing.

In testimony whereof I affix my signature.

ANDREW L. JACKSON.